United States Patent [19]
Laurenz

[11] Patent Number: 5,255,633
[45] Date of Patent: Oct. 26, 1993

[54] FLUID APPLICATOR FOR ANIMALS HAVING A METERING DISPENSING VALVE

[76] Inventor: Frank P. Laurenz, P.O. Box 359, Eagle Butte, S. Dak. 57625

[21] Appl. No.: 726,029

[22] Filed: Jul. 5, 1991

[51] Int. Cl.⁵ ............................................. A01K 29/00
[52] U.S. Cl. ................................................ 119/157
[58] Field of Search .................................... 119/157

[56] References Cited

U.S. PATENT DOCUMENTS

| | | | |
|---|---|---|---|
| 1,327,088 | 1/1920 | Curttright | 119/157 |
| 2,800,108 | 7/1957 | Duff | 119/157 |
| 2,912,961 | 11/1959 | Stark | 119/157 |
| 3,051,128 | 8/1962 | McKinley | 119/157 |
| 3,190,266 | 6/1965 | Malec | 119/157 |
| 3,306,264 | 2/1967 | Berens | 119/157 |
| 4,014,294 | 3/1977 | Hovorak | 119/157 |

Primary Examiner—Robert P. Swiatek
Assistant Examiner—Todd E. Manahan

[57] ABSTRACT

A dispensing device for applying liquids such as pesticides to the coat of an animal comprises an elongate rope mounted at an upper end on a bracket and at a lower end position spaced from the bracket outwardly; to one side to allow the animal to pass under the rope and to rub its back on the rope. The bracket includes a valve operable by the upward force from the rope to dispense a measured dose of liquid onto the rope to impregnate the rope for applying the liquid to the animal's coat. The valve is operated so that it is closed at a lower end by the upward force allowing the valve body to fill with the dose. When the animal releases the rope the measured dose is deposited onto the rope to maintain the required impregnation.

5 Claims, 3 Drawing Sheets

FLUID APPLICATOR FOR ANIMALS HAVING A METERING DISPENSING VALVE

BACKGROUND OF THE INVENTION

This invention relates to a device for dispensing liquid onto an animal which is particularly but not exclusively designed for dispensing pesticide onto the coat of the animal by a self-application system in which the animal rubs against the device.

Devices are well known which provide a rope against which the animal rubs with the rope being attached to a bracket operable to control dispensing of liquid onto the rope so that as the animal rubs it applies the liquid into its coat. Such devices are particularly used for dispensing pesticide for killing insects on the animal to improve its comfort and well-being.

In one particular design of the device of this type the rope is attached at its upper end to a bracket which supports the rope at an inclined position extending downwardly and outwardly toward the ground. The lower end of the rope is coupled to a spring which holds it taut. As the animal rubs underneath the rope the coupling member attached to the upper end of the rope moves relative to the bracket and operates a valve which opens when the rope is pushed upwardly to discharge the liquid from a container onto the coupling member and therefrom onto the rope.

Devices of this type are widely used but are considered to be somewhat unsatisfactory since the liquid is often wasted by being dispensed too rapidly. A large portion of the liquid therefore ends up on the ground rather than on the animal. This of course is both expensive due to the loss of the liquid and also is environmentally undesirable since pesticides of this type are of course environmentally damaging.

Up until now therefore there has been no solution to this problem and farmers have simply accepted the high proportion of waste and losses.

SUMMARY OF THE INVENTION

It is one object of the present invention, therefore, to provide an improved device of this general type for dispensing liquid onto an animal.

According to the invention there is provided a device for dispensing liquid onto an animal comprising a rope, a bracket attached to a upper end of the rope, means for mounting the bracket at a position spaced from the ground for supporting the upper end at a location spaced from the ground, a tension spring attached to a lower end of the rope, means for coupling the tension spring to a support element at a position below the bracket and spaced away from a position beneath the bracket so that the rope is maintained taut at an angle to the vertical to allow an animal to pass under the rope and to rub its back against the rope, and means for dispensing a liquid onto the rope for transfer to the animal, said dispensing means comprising a fixed abutment member mounted on said bracket, a pivotal coupling member mounted on said bracket for pivotal movement relative to the fixed abutment member and connected to the upper end of the rope such that engagement of the rope by an animal rubbing its back causes the pivotal coupling member to be pivoted from a rest position to an abutment position in contact with the fixed abutment member, a container for receiving said liquid, and valve means for releasing said liquid onto the rope from the container in response to movement of the pivotal coupling member, wherein the valve means comprises a valve body defining a chamber therethrough, means on the valve body for connecting the valve body to the container at one end of the valve body, a discharge opening at an end of the body opposed to said one end, and a valve member mounted in the valve body and movable longitudinally of the chamber, the valve member including a first valve closure element at said one end movable to a closed position for closing the entry into the chamber of said liquid from the container and movable to an open position to release liquid into the chamber, means biassing the valve member into said closed position, the valve member further including a second closure element for closing the discharge opening and movable to an open position to release liquid from the chamber and from the open position to a closed position closing the discharge opening, the first and second valve elements being mounted on the valve member such that in a rest position of the pivotal coupling member the valve member is biassed to a position in which the first closure element is in a closed position and the second closure element is in the opened position and when the pivotal coupling member moves to the abutment position the valve member is moved longitudinally so that the first valve element is in the open position and the second valve element is in the closed position.

The valve system especially created for the above device therefore more effectively controls the liquid so that it is only dispensed as a single dose and does not continue to be dispensed for the full period that the animal is rubbing on the rope. This system has been found to be highly effective in controlling the amount of liquid so that it is properly employed to impregnate the rope and thus to be applied to the animal rather than oversoaking the rope and causing the liquid to simply fall to the ground and be wasted. Significant savings in cost of the liquid can therefore be obtained.

With the foregoing in view, and other advantages as will become apparent to those skilled in the art to which this invention relates as this specification proceeds, the invention is hereby described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
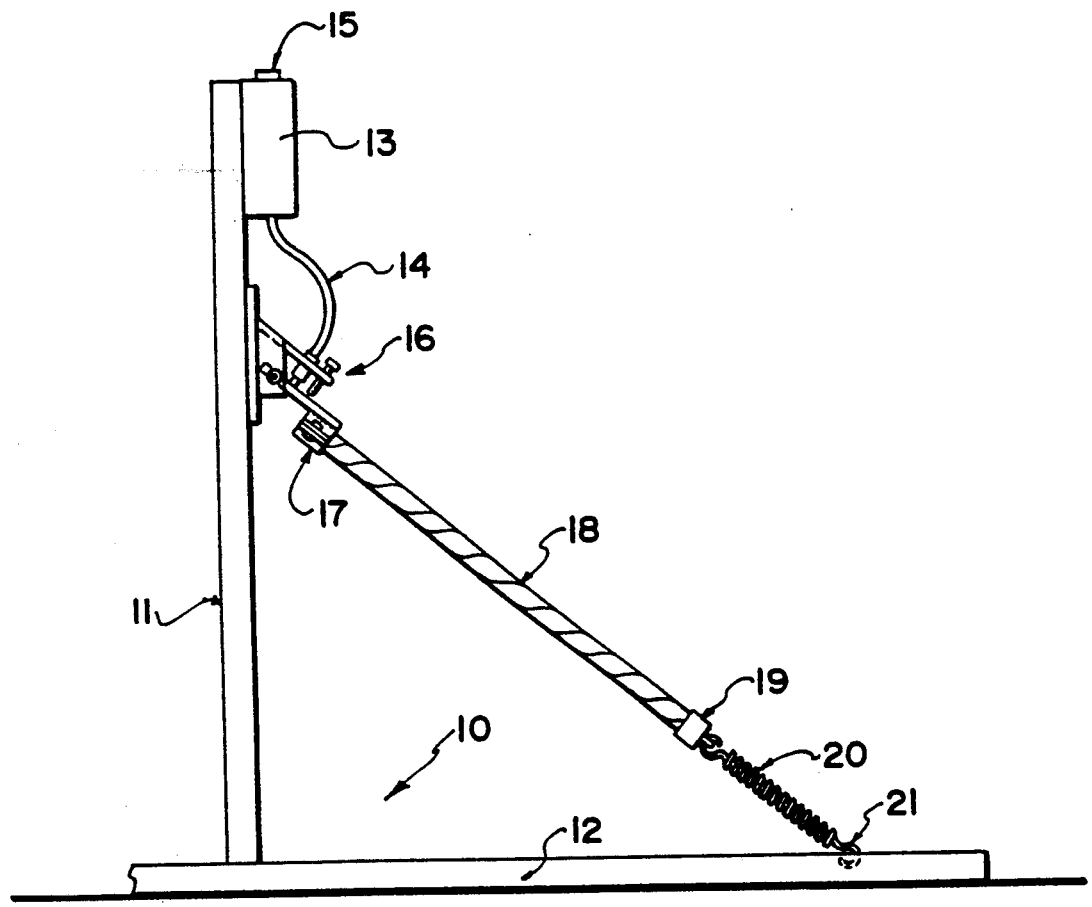
FIG. 1 is a side elevational view of the complete device according to the present invention.

The apparatus comprises a frame generally indicated at 10 including a post 11 and a base 12. On top of the post 11 is mounted a container 13 for receiving a liquid for example a pesticide to be dispensed to the animal. The container includes a discharge tube 14 extending from the base of the container and a filler cap 15. A bracket generally indicated at 16 is mounted on the post 11 and provides a clamp 17 for attachment to the upper end of a rope 18. At the lower end of the rope 18 is provided a coupling 19 which is attached to a spring 20 which in turn is attached to a hook 21 linked to the frame at a position spaced from the base of the post 11. In this way the rope extends outwardly and downwardly from the post so that an animal can pass under the rope and can rub its back against the rope. The spring maintains the rope relatively taut but allows some flexibility in the rope so that it can be flexed upwardly by the action of the animal.

Devices of this type are generally known.

Figure 2:
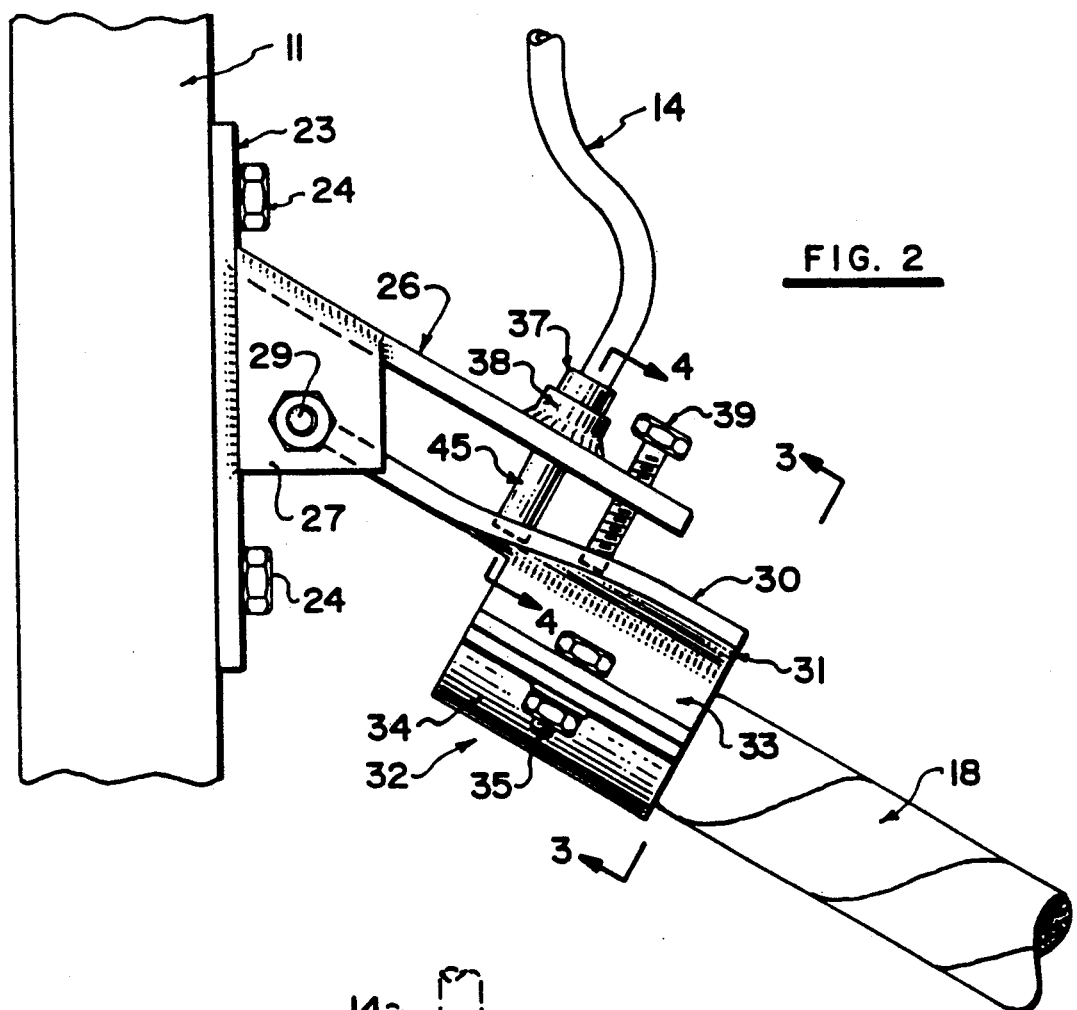
FIG. 2 is a side elevational view on an enlarged scale of the bracket and valve system by which the dispensing of the liquid is obtained.
Figure 3:
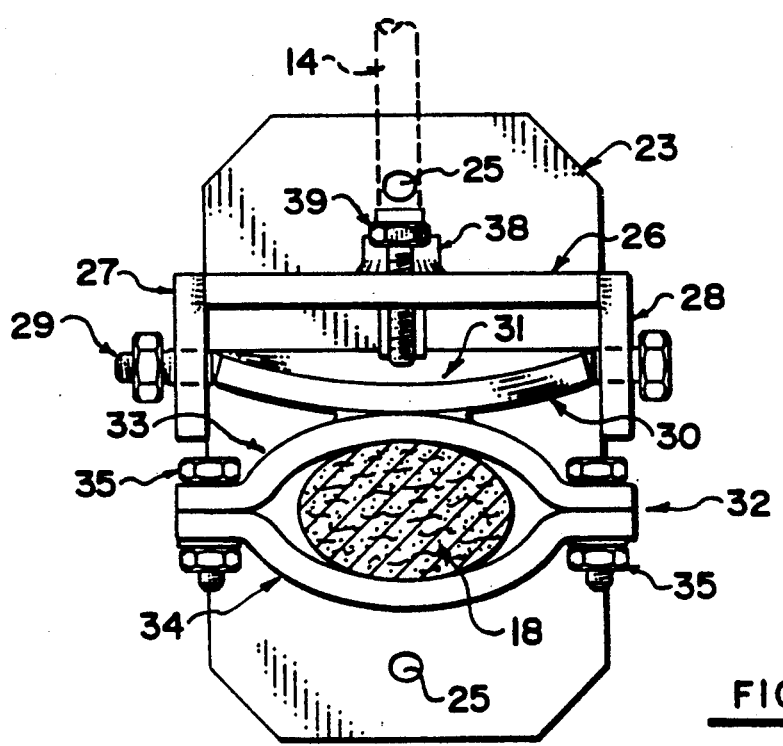
FIG. 3 is a view along the lines 3—3 of FIG. 2.

Turning now to FIGS. 2 and 3, the bracket on the upper end of the rope are shown in more detail. The bracket includes a base plate 23 which is attached to the post by bolts 24. The base plate 23 is a flat plate with holes 25 for receiving the bolts 24 in the clamping action. A fixed abutment plate 26 is attached to the base plate and extends therefrom outwardly and downwardly at an angle of the order of 45°. The fixed abutment plate is supported by a pair of side flanges 27 and 28 which are welded to the base plate and to the fixed abutment plate to maintain the angle of the fixed abutment plate fixed relative to the base plate. The side flanges 27 and 28 also provide support for a pivot mounting 29 of a pivot coupling plate 30 which extends outwardly and downwardly from the side flanges in a direction generally parallel to the fixed abutment plate. The pivot coupling member comprises also a plate similar in shape to the rectangular plate forming the fixed abutment plate but in this case a lower part of the plate 30 is curved as indicated at 31 to form a dish-shape across the width of the plate thus forming a channel along the plate confining liquid to the central area of the plate to run down the plate and to drip off the end of the plate at a position approximately mid-way across the plate.

On the underside of the plate 30 is welded a clamp system 32 including an upper clamp sleeve part 33 and a lower clamp sleeve part 34 which include flanges projecting outwardly from the sides which are then clamped together by a nut and bolt combination 35. As shown in FIG. 3, therefore, the end of the rope is clamped and extends outwardly from the lower end of the clamp at a position aligned with the center of the dished plate 30. The tension on the spring 20 maintains the rope extending straight from the clamp to the lower end at the hook 21 which holds the plate 30 in an initial rest position.

The pipe 14 from the container includes an end coupling 37 which has a screw thread for fitting into an inlet opening of a valve 38 mounted on the fixed plate 26. The valve includes a portion extending through the plate into engagement with the pivotal plate 30. An adjustment screw 39 also passes through an opening in the plate 26 and includes a lower end which can contact the plate to locate the amount of movement of the plate in an upward direction.

Figure 4:
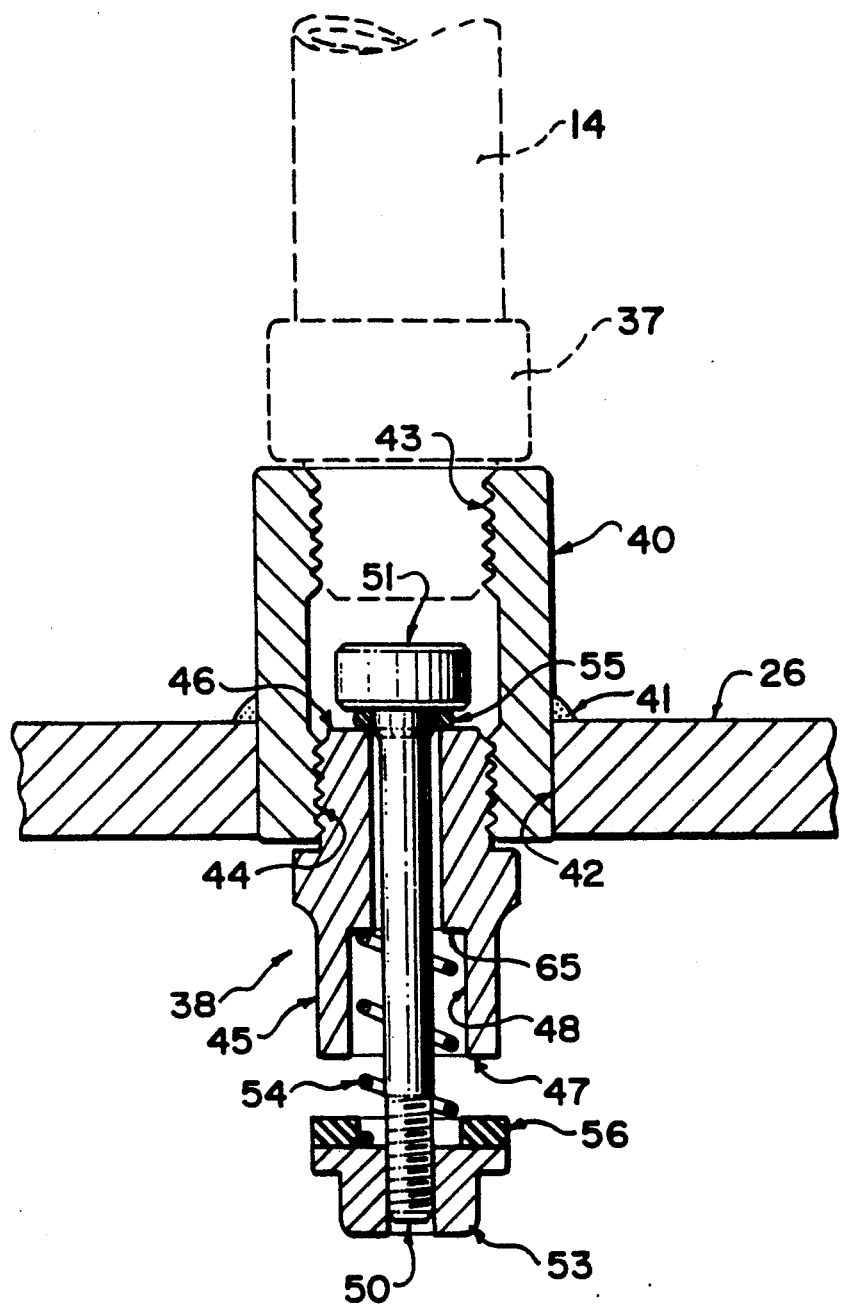
FIG. 4 is a view along the lines 4—4 of FIG. 2 with the hose from the container disconnected for convenience of illustration.

Turning now to FIG. 4, the details of the valve are shown in cross section mounted on the plate 26. The valve includes a sleeve 40 welded at a weld line 41 to the plate and passing through an opening 42 in the plate. The sleeve includes a first screw thread 43 for cooperation with a male screw thread on the coupling 37. The sleeve includes a second screw thread 44 for connection to a valve body 45.

The valve body 45 comprises a cylindrical body having an upper end 46 and a lower end 47. Inside the valve body is a cylindrical bore 48 which extends from the upper end to the lower end. The upper part of the valve body includes a male screw thread for cooperating with the female screw thread 44 to hold the valve body in place projecting into the sleeve 40.

A valve member 50 comprises an elongate pin with a head 51 at the upper end of increased diameter relative to the diameter of the pin. The pin extends through the valve chamber or cylinder 48 from the head 51 to a lower end projecting out from the lower end 47 of the valve body. A second head 53 is attached at the lower end preferably by a screw thread arrangement which cooperates with a screw thread on the pin 50. In this way the position of the head 53 along the length of the pin can be adjusted to increase or decrease the amount of movement available of the valve member. The valve member is spring-biased by a spring 54 which is a compression spring acting between a shoulder 65 within the valve chamber and the adjacent face of the head 53.

A first valve element in the form of an O-ring is indicated at 55 and is positioned under the head 51 to act as a seal between the head and the end 46 of the valve body. When the position shown in FIG. 4, therefore, the valve member is spring-biased downwardly to close the upper end of the valve to prevent the flow of liquid past the upper end of the valve member and into the valve chamber.

A second valve element in the form of an annular rubber ring is indicated at 56. The second valve element 56 is normally maintained spaced from the end 47 of the valve body by the action of the spring 54. However upon engagement of the plate 30 with the valve member head 53, the valve member is forced upwardly to a position in which the second valve element 56 closes the lower end 47 of the valve body. This movement occurs on engagement of the rope by the animal in a normal back scratching action which pushes the rope upwardly and thus forces the rope and the plate 30 upwardly in a relatively vigorous pushing action. The pin 39 is adjusted to a position so that the valve member can be fully moved upwardly into the closed position but then prevents any further upward movement which could damage the valve.

When the valve member is moved upwardly into the abutment position, the lower end of the valve body is closed but the upper end of the valve body is opened to allow the liquid to flow into the valve body to fill the valve body to provide a dose amount of liquid within the valve body. This dose then remains in position while the upward force on the rope continues but is then released as soon as the upward force is removed so that the valve member moves downwardly. The downward movement to revert to the rest position again closes the upper part of the valve so that only the dose of liquid carried by the valve body is released from the lower end of the valve body onto the curved upper surface of the plate 30 to run down to the rope. This control over the amount of liquid which provides the amount in measured doses and prevents the continuation of the feed of the liquid while the rope is pushed by the animal provides the measured or required amount of liquid which maintains the rope properly impregnated but prevents the discharge of excess amounts of liquid which would otherwise drop from the rope to the ground.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A device for dispensing liquid onto an animal comprising a rope, a bracket attached to a upper end of the rope, means for mounting the bracket at a position spaced from the ground for supporting the upper end at a location spaced from the ground, a tension spring attached to a lower end of the rope, means for coupling the tension spring to a support element at a position below the bracket and spaced away from a position beneath the bracket so that the rope is maintained taut at an angle to the vertical to allow an animal to pass under the rope and to rub its back against the rope, and means for dispensing a liquid onto the rope for transfer to the animal, said dispensing means comprising a fixed abutment member mounted on said bracket, a pivotal coupling member mounted on said bracket for pivotal movement relative to the fixed abutment member and connected to the upper end of the rope by an animal rubbing its back causes the pivotal coupling member to be pivoted from a rest position to an abutment position in contact with the fixed abutment member, a container for receiving said liquid, and valve means for releasing said liquid onto the rope from the container in response to movement of the pivotal coupling member, wherein the valve means comprises a valve body defining a chamber therethrough, means on the valve body for connecting the valve body to the container at one end of the valve body, a discharge opening at an end of the body opposed to said one end, and a valve member mounted in the valve body and movable longitudinally of the chamber, the valve member including a first valve closure element at said one end movable to a closed position for closing the entry into the chamber of said liquid from the container and movable to an open position to release liquid into the chamber, means biassing the valve member into said closed position, the valve member further including a second closure element for closing the discharge opening and movable to an open position to release liquid from the chamber and from the open position to a closed position closing the discharge opening, the first and second valve elements being mounted on the valve member such that in a rest position of the pivotal coupling member the valve member is biassed to a position in which the first closure element is in a closed position and the second closure element is in the opened position and when the pivotal coupling member moves to the abutment position the valve member is moved longitudinally so that the first valve element is in the open position and the second valve element is in the closed position.

2. The device according to claim 1 wherein the single dose of said liquid is defined in the space between the valve member and the chamber so that movement of the pivotal coupling member from the abutment position allows the release of the single dose.

3. The device according to claim 1 wherein the valve member comprises an elongate rod having a head at said one end of the valve body with said first valve closure element comprising a sealing ring surrounding the rod at the head for engaging said one end of the valve body and a second head at the second opposed end thereof and said second closure element comprising a second sealing ring surrounding the rod at the second head and movable to close the discharge end of the valve body.

4. The device according to claim 1 wherein the valve means is mounted on the fixed abutment member and wherein the pivotal coupling member is mounted beneath the fixed abutment member and comprises a plate having a curved upper surface for engaging the valve means, the valve means being arranged to discharge said liquid onto the curved upper surface so that the curved upper surface guides the liquid from the valve means to the rope.

5. The device according to claim 1 including adjustable stop means for limiting movement of the pivotal coupling member towards said fixed abutment member.

* * * * *